United States Patent Office 3,767,787
Patented Oct. 23, 1973

3,767,787
RETARDED VAPORIZATION COMPOSITIONS AND
METHOD FOR MAKING
Herbert A. Segal, Huntingdon Valley, Pa. (Ashton Hall,
2109 Red Lion Road, Philadelphia, Pa. 19115)
No Drawing. Continuation-in-part of abandoned application Ser. No. 840,828, July 10, 1969. This application Oct. 7, 1971, Ser. No. 187,356
Int. Cl. A61l 13/00; B01j 13/00
U.S. Cl. 424—76
10 Claims

ABSTRACT OF THE DISCLOSURE

Retarded vaporization compositions are provided consisting essentially of a non-aqueous colloidal system containing finely divided fumed amorphous silica, a gelatinizing agent, a nonpolar odoriferous material which is not miscible with water, and a liquid hydroxy compound, which composition upon contact with water releases the odoriferous material. In a preferred embodiment, the compositions may also include a bactericidal agent which is also released upon contact with water. The method of preparing the aforesaid retarded vaporization compositions includes the blending of the components and their subsequent curing for one-quarter hour to eight hours at a temperature within the range of about 110° F. to 160° F.

---

This application is a continuation-in-part of my copending patent application Ser. No. 840,828, filed July 10, 1969, which is now abandoned.

The present invention is directed to a retarded vaporization composition and method for preparing the same, and more particularly to a composition which enables odoriferous material and optionally bactericidal agents, to be maintained in a relatively non-volatile state for extended periods of time, and released when the composition is contacted with water (moisture).

There has been a long felt need for retarded vaporization compositions, namely compositions which enable a relatively highly volatile odoriferous material to be stored for extended periods of time. A retarded vaporization composition having the foregoing characteristics has utility in a wide variety of usages. By way of example, and not by way of limitation, such usages would include a vaporizer, was contacted with water or water vapor; a household deodorant, where the deodorant was contacted with moisture from a humid atmosphere; an insecticide, and/or insect repellent where the same was contacted with perspiration or other moisture; a dog repellent where the same was contacted by dog urine; a urinal or bedpan disinfectant; etc.

The desirable physical properties for a retarded vaporization composition include: stability in storage for extended periods of time, and stability on contact with extreme temperature changes, such as the extreme temperatures most commonly encountered under ambient conditions.

This invention has as an object the provision of a novel retarded vaporization composition in which odoriferous material is retained in an non-aqueous colloid, in which state there is relatively little volatilization of the odoriferous material, but which on contact with moisture ("moisture" as used herein includes both liquid water and water vapor) changes to an aqueous system in which the non-polar volatile materials are released to the atmosphere (relatively rapid volatilization).

This invention has as another object the provision of a retarded vaporization composition which is relatively stable to temperature extremes with the range of about −20° F. to 160° F., with minimal synaeresis.

This invention has as another object the provision of retarded vaporization composition which may be readily packaged due to its low vaporization pressure.

This invention has as a further object the provision of a retarded vaporization composition containing bactericidal agents which are slowly released on contact with water for use as a germicide or disinfectant.

Other objects will appear hereinafter.

The retarded vaporization compositions of the present invention comprise a non-aqueous colloidal system which releases an odoriferous material upon contact with aqueous moisture. The compositions include finely divided fumed amorphous silica; in particular, powdered Cab-O-Sil, which is more than 99 weight percent of fumed amorphous silica, having an average particle size of about 0.011 micron and an approximate surface area of about 160 square meters per gram. The fumed amorphous silica constitutes the gelling agent for the non-aqueous colloid.

The retarded vaporization composition of the present invention also includes a gelatinizing agent which is capable of being suspended in a non-aqueous colloid, and which is also capable of forming an aqueous colloidal gel on contact with water. A wide variety of gelatizing agents having the aforesaid attributes may be used in the retarded vaporization compositions of the present invention.

By way of example, suitable gelatinizing agents include "gums" as that term is hereinafter defined, and as the term is defined in the fourth paragraph of p. 741 of vol. 10, Kirk-Othmer, Encyclopedia of Chemical Technology, 2 ed. Such gelatinizing agents include the natural gums, such as plant exudates like gum arabic, gum tragacanth, gum karaya, gum ghatti; the seed or root natural gums, such as locust bean gum, guar gum, psyllium seed gum, quince seed gum; the seaweed extracts, such as agar, aligin, carrageenan, furcellaran, and other natural materials such as pectin, gelatin, starch, and larch gum. The gelatinizing agents of the present invention also include modified (semisynthetic) gums, namely chemically modified natural gums or derivatives of naturally occurring materials, such as cellulose derivatives like carboxymethylcellulose, methylcellulose, hydroxypropylmethylcellulose, hydroxypropylcellulose; hydroxyethylcellulose, and ethylhydroxyethylcellulose; starch derivatives, such as carboxymethylstarch, hydroxyethylstarch, and hydroxypropylstarch; microbial fermentation gums, such as dextran and polysaccharide B–1459, and materials such as low-methoxyl pectin, propylene glycol alginate, triethanolamine alginate, carboxymethyl locust bean gum, carboxymethyl guar gum. The gelatinizing agents also include synthetic gums, namely completely synthesized chemical products such as vinyl polymers like polyvinylpyrrolidone, polyvinyl alcohol, and carboxyvinyl polymer; acrylic polymers like polyacrylic acid and polyacrylamide; and ethylene oxide polymers.

These materials are generally referred to as "gum," as this term is now widely used to refer to any material that can be dissolved or dispersed in water to give viscous or mucilaginous solutions or dispersions.

A wide variety of suitable gelatinizing agents capable of being suspended in a non-aqueous colloidal system, and which are capable of forming an aqueous colloidal gel on contact with water are known to those having ordinary skill in the art, and the selection of any particular gelatizing agent having these attributes falls within the skill of a chemist working in this art.

The retarded vaporization compositions of the present invention also include an odoriferous material. For the purposes of this invention, the term "odoriferous material" constitutes a non-polar [1] organic liquid which has an appreciable vapor pressure, which is capable of being suspended in the non-aqueous colloidal system, which is not miscible with water, and which bleeds or migrates to the surface and volatilizes relatively rapidly when the composition is contacted with water. The particular type of odoriferous material which may be used in the compositions of the present invention is dependent upon the use to which the retarded vaporization compositions of the present invention are put.

Suitable odoriferous materials include the essential oils. By way of example, the essential oils include bergamot, citronella, geranium, lavender and spike lavender, lemon, lime, linaloe and bois de rose, petitgrain, attar of roses, sandalwood, cedarleaf, eucalyptus, lemongrass, orange, palmarosa, patchouli, rosemary, vetiver, ylang-ylang, wintergreen, jasmine, etc.

Depending upon the usage to which the retarded vaporization composition is put, the odoriferous material may be a commercial non-polar insect repellent, a commercial vaporizing agent, such as the so-called "Vicks Vaposteam"; or a commercial dog repellent, such as "Ridz."

Alternatively, the odoriferous agent may be an olefactory surpressant, such as amyl acetate, or phenyl acetaldehyde.

The retarded vaporization compositions of the present invention may include a liquid monohydric alcohol which is at least partially miscible in water or a non-ionic surfactant. Any of such monohydric alcohols may be used in the present invention, although for many compositions a highly toxic alcohol such as methanol should be avoided because of its toxicity. Examples of the monohydric alcohols include methanol, ethanol, propyl alcohol, isopropyl alcohol, normal butyl alcohol, isobutyl alcohol, secondary butyl alcohol, tertiary butyl alcohol, amyl alcohol, isoamyl alcohol, tertiary amyl alcohol.

In addition, the retarded vaporization compositions of the present invention also include a polyhydroxy compound which is at least partially miscible in water. Examples of such polyhydroxy compounds are: ethylene glycol; diethylene glycol; triethylene glycol; tetraethylene glycol; trimethylol propane; propylene glycol; 1,4-butanediol, dipropylene glycol, 1,2,6-hexanetriol, glycerine; 2-methyl, 2-ethyl-1,3-propanediol; 1,3-butanediol; 2-methyl-2,4-pentanediol; 1,4-butanediol; 1,2,4-butanetriol, and diglycerol.

Commercial non-ionic surfactants can be used as substitutes for the monohydric alcohols. These include by way of examples: Tween 20, Tween 21, Tween 40, Tween 60, Renex 30, Renex 36, etc.

As aforesaid, the retarded vaporization compositions of the present invention comprise a mixture of both monohydroxy and polyhydroxy compounds. The monohydroxy compounds have as their prime function the dispersal of the odoriferous material uniformly throughout the gelled composition. The polyhydroxy compounds assist the gelatinizing agent in forming the gelled system.

Preferably, a surfactant should be present in the composition when difficulty is encountered in producing a nonaqueous soluble system.

Advantageously, the retarded vaporization compositions of the present invention may contain one or more bactericidal agents which are slowly released upon contact of the compositions with moisture. Such bactericide-containing compositions have particular utility as disinfectants, sanitizers, germicides, etc., which may be employed in lavatories, hospitals, and the like.

Suitable bactericides for use in the compositions of the present invention may be selected from a large number of well-known and proprietary compounds. For example, the bactericides include organic mercurial compounds, such as phenylmercuric nitrate, acetate, benzoate or borate, merbromin NF, thimerosal NF, and nitromersal; halogens and halogen containing compounds, such as tincture of iodine and organic chlorine containing compounds; bisphenols and phenols, including phenol itself (carbolic acid); and quaternary ammonium compounds. Also, certain essential oils, such as thymol (oil of thyme), and certain monohydric alcohols, such as ethanol and isopropanol, which have some bactericidal properties may be selected for the odoriferous material and monohydric alcohols, respectively, of the above-described compositions.

It is, of course, preferred that the bactericides selected for the compositions of the present invention have a U.S.D.A. "cidal" rating (bacterial killing) and that they be non-polar in reference to water so that the optimum effectiveness is obtained. Particularly preferred bactericides which may be employed are the alkyl dimethyl benzyl ammonium chlorides (or benzalkonium chlorides) having alkyl groups from $C_8H_{17}$ to $C_{18}H_{37}$. These are quaternary ammonium compounds, and are commercially available under a number of trademarks including "Zephiran" (Winthrop Laboratories—Sterling Drug Co.) and "Hyamine" (Rohm and Haas Company). For example, Hyamine 3500 is an 80% mixture of n-alkyl dimethyl benzyl ammonium chlorides in ethanol having alkyl groups in the following ratio: 50% $C_{14}$, 40% $C_{12}$, 10% $C_{16}$.

The compositions of the present invention may also contain, if desired, various bacteriostatic (prevent bacteria growth as opposed to bacteria killing) agents, such as hexachlorophene. The use of dry powder bacteriostats like hexachlorophene may be particularly helpful to achieve the desired viscosity or solid-liquid ratio for the gelatinous colloidal systems. By using hexachlorophene, for example, instead of extra fumed amorphous silica where extra solids are needed, the added advantage of bacteriostatic properties is obtained. However, this is not essential.

The weight percentage (based on the final mixture) of the components of the retarded veporization compositions of the present invention may be varied depending upon the usage to which the compositions are put, and the nature of the components. However, in all cases, the weight percentage of the components should be such as to yield a non-aqueous stable colloid having a low volatility. Generally, this will require at least about 4 up to 15 or more weight percent of fumed amorphous silica, about 5 to 25 weight percent of gelatinizing agent, about 1 to 15 weight percent of odoriferous material, with the remainder constituting the hydroxy compounds, namely, the mixture of monohydroxy and polyhydroxy compounds.

It is important for the composition to achieve a relatively viscous state prior to heat curing; otherwise, if the blend is too liquid, the proper formation of the gelatinous colloid will be difficult or impossible to achieve by the curing method. The relationship of the total mass of solid components (e.g., fumed silica, gelatin and hexachlorophene) to the total mass of liquid components (e.g. monohydroxy and polyhydroxy compounds) will generally fall within a certain range. This range will vary somewhat depending upon the solubilities and viscosities of the particular materials chosen, but will usually be about 20 to 40 weight percent solids.

It is difficult to fix a ratio between the non-ionic surfactant and/or monohydroxy compounds and the poly-

---

[1] As used throughout the application non-polar means a compound that is non-miscible with water, has a low dielectric constant, is a non-electrolyte.

hydroxy compounds in the compositions of the present invention. This ratio will vary depending on the remaining components of the composition. Generally speaking, the non-ionic surfactant and/or monohydroxy compound portion of the composition should be raised when difficulty is encountered in despersing the odoriferous materials uniformly in non-aqueous gel. A suitable ratio of monohydroxy to polyhydroxy compounds in the composition is between about 1 to 10 and about 2 to 1 by weight.

The amount of non-polar bactericidal agent may vary over a wide range, depending on intended use and effectiveness of the particular bactericide, and may even be absent from the composition. However, for general lavatory and hospital uses, about 6 to 30 weight percent (active ingredient) bactericide is preferably present.

The retarded vaporization compositions of the present invention are prepared by blending the components using mild agitation. In particular, the fluffy nature of the fumed amorphous silica requires mild agitation.

The blending can be performed at room temperature. For ease of handling, it is convenient to first mix all of the liquid components, and then with slow agitation, add the fumed amorphous silica and gelatinizing agent, and other solids.

After the composition has been blended as aforesaid, it is necessary that it be cured at a temperature of from about 110° F. to 160° F. or more. The time duration of curing is inversely related to the temperature of curing. At 160° F., an appropriate time duration of one-quarter hour can be used for curing. At a temperature of 110° F., eight (8) hours is a suitable time duration for curing. A curing temperature of 160° F. is not to be considered as an absolute maximum, since higher temperatures could be employed. However, temperatures above 160° F. are not necessary and may not be suitable where low boiling point components are present or where low melting point containers are used.

The curing can be accomplished in the final vessel. Thus, the components of the composition can be blended, and the blended mixture poured into the storage vessel. The composition can then be cured in the storage vessel.

I have found that the curing effects stabilization of the composition.

The compositions of the present invention contemplate mixtures of components. By way of example, the odoriferous material may include both an essential oil, such as oil of wintergreen, and an olefactory suppressant. In addition, minor amounts of other materials may be present, such as chlorophyllin, depending upon the use to which the final product is put. In addition, combinations of gelatinizing agents may be used.

The following examples are illustrative of compositions of the present invention. In each case, the procedure set forth above is followed, namely the liquids are first blended and then the solids added slowly with very mild agitation to form the non-aqueous colloid:

EXAMPLE 1

A deodorant for usage in bedpans and urinals, which releases its odoriferous material and nasal suppressant upon contact with fecal matter or urine may be prepared by blending:

| | Lbs. |
|---|---|
| Amyl acetate | 0.6 |
| Oil of wintergreen | 3.4 |
| Isopropanol | 8.0 |
| Glycerine | 68.0 |

To this liquid mixture may be added:

| | Lbs. |
|---|---|
| Cab-O-Sil M5 | 5.0 |
| K & K 275 Bloom edible porkskin gelatin | 15.0 |
| Chlorophyllin | 0.025 |
| Texachlorophene | 0.25 |

The resultant mixture should be mixed very slowly until homogeneously blended. The final product can be extruded or spooned into suitable containers. When sealed, it is cured at a temperature of 160° F. for 15 minutes. It can be stored under ambient conditions for extended periods of time without releasing either the odoriferous material (oil of wintergreen) or the nasal suppressant (amyl acetate). However, on contact with moisture, both the oil of wintergreen and the amyl acetate are slowly released.

EXAMPLE 2

A suitable colloidal composition for use in a steam vaporizer consists of:

| | Percent |
|---|---|
| Cab-O-Sil | 4.5 |
| Gelatin | 13.5 |
| "Vicks Vaposteam" commercial vaporizer base | 23 |
| Glycerine | 49 |
| Tween 20 | 10 |

The resultant mixture should be mixed very slowly until homogeneously blended. It can be extruded or spooned into suitable containers. When sealed, it can be cured at a temperature of 150° F. for 4 hours.

EXAMPLE 3

An insect repellent which slowly releases the repelling material may be prepared from the following composition:

| | Percent |
|---|---|
| Cab-O-Sil | 4.5 |
| Gelatin | 13.5 |
| "OFF" insect repellent | 9.0 |
| Isopropanol | 18.0 |
| Glycerine | 55 |

The resultant composition should be mixed very slowly until homogeneously blended. The final product can be extruded into a suitable container. When sealed, it can be cured at a temperature of 140° C. for 8 hours.

The above composition will gradually release the "OFF" insect repellent on contact with moisture.

EXAMPLE 4

A suitable dog repellent may be prepared by blending the following components:

| | Percent |
|---|---|
| Cab-O-Sil | 4.5 |
| Gelatin | 13 |
| "Ridz" commercial dog repellent | 10.5 |
| Isopropanol | 18 |
| Glycerine | 54 |

The resultant mixture should be mixed slowly until homogeneously blended. The final product can be extruded into a suitable container. It can be cured at a temperature of 145° F. for 6 hours.

EXAMPLE 5

A slow release deodorizer for bathrooms may be prepared from the following composition:

| | Lbs. |
|---|---|
| Amyl acetate | 1 |
| Amyl alcohol | 10 |
| Propylene glycol | 57 |
| Cab-O-Sil | 5 |
| Oil of lemon grass | 3 |
| Oil of fir Canadian | 2 |
| Carboxymethylcellulose | 22 |
| Chlorophyllin | 0.04 |

The resultant mixture should be mixed very slowly until homogeneously blended. The final product can be extruded or spooned into suitable containers. When sealed, it is cured at a temperature of 160° F. for 15 minutes.

EXAMPLE 6

A slow release agent for general household use may be prepared from the following composition:

| | Lbs. |
|---|---|
| Cab-O-Sil | 5 |
| Phenyl acetaldehyde | 5 |
| Amyl alcohol | 12 |
| Ethyleneglycol | 55 |
| Guar gum | 15 |
| Chlorophyllin | 0.03 |
| Oil of pine | 5 |

The resultant mixture should be mixed very slowly until homogeneously blended. The final product can be cured or spooned into suitable containers. When sealed, it is cured at a temperature of 140° F. for 8 hours.

The Examples 7–12 listed in Table I indicate various formulations for retarded vaporization compositions of the present invention containing bactericidal agents. In each case the liquids are first blended and the solids added slowly with mild agitation to form a non-aqueous homogeneous colloid. The resulting blend can be extruded or spooned into a suitable container and cured overnight (8 hours) in a 140° F. oven. The bactericide used in each example was Hyamine 3500, a blend of alkyl dimethyl benzyl ammonium chlorides (80% active ingredients, 20% ethanol) available from Rohm and Haas Company.

The formulations of Examples 7–12 are particularly suitable for use in urinals for both general and hospital use. To demonstrate the effectiveness of the bactericide release in such formulations, a sample according to Example 7 was tested by the following procedure:

To each of four samples of sterilized urine was added a different known organism. Each of the contaminated urine specimens was then added to a separate urinal of the type described in U.S. Pat. 3,471,869, issued Oct. 14, 1969 to Herbert A. Segal for "Receptacle." To the deodorant/disinfectant cap of each urinal was then added a 2 gram sample of the formulation of Example 7. At periodic intervals, each urinal was cultured for bacteria growth and the results are listed in Table II. As seen from the table most common organisms were killed in a period of 2 hours or less. In addition, all samples provided a pleasing odor to the atmosphere surrounding each urinal.

Another test was run on the eye mucosa of nine New Zealand white rabbits to determine the toxicity of the formulation of Example 7. The test was run according to the method described at pp. 49-51 of Food and Drug Officials of the United States, Appraisal of the Safety of Chemicals in Food, Drugs, and Cosmetics, Baltimore, Md., each rabbit receiving 0.1 ml. of the formulation of Example 7 in its left eye. There were signs of mild irritation in eyes of animals receiving no washout, and one-third of the animals showed slight cornea opacity after seven days. However, there were no signs of permanent corneal damage, and there was a decrease in irritation as related to time of washouts.

The substitution of the various gelatinizing agents, odoriferous materials, and hydroxy compounds heretofore listed in the non-aqueous colloidal retarded vaporization compositions of the present invention falls within the skill of one having ordinary skill in the art.

While I do not wish to be bound by any theory in respect to the operation of my invention, I am of the opinion that the non-aqueous colloidal system maintains the non-polar odoriferous material in a low vapor pressure state with a low surface area. Upon contact with aqueous moisture, the non-polar odoriferous material, which is not miscible with water, progresses to the surface of the retarded vaporization composition, and is released to the atmosphere. This procedure permits sustained slow-release of odoriferous material to the atmosphere.

The compositions of the present invention may be stored for extensive periods of time in a sealed container with excellent immunity to deleterious changes of the system. Moreover, the compositions of the present invention are not adversely affected by the temperature extremes normally encountered in shipment.

The present invention may be embodied in other specific forms without departing from the spirit or essential attributes thereof.

TABLE I

| | Weight percentages | | | | | |
|---|---|---|---|---|---|---|
| Example number | 7 | 8 | 9 | 10 | 11 | 12 |
| Components: | | | | | | |
| Cab-O-sil | 11 | 9 | 15 | 14 | 8 | 15 |
| Gelatin | 12 | 14 | 10 | 15 | 14 | 7 |
| Hexachlorophene | 6 | 6 | 4 | | 7 | 7 |
| Isopropanol | 23 | 25 | 21 | 20 | 19 | 23 |
| Glycerin | 24 | 20 | 26 | 21 | 27 | 24 |
| Amyl acetate | 1 | 2 | | | 2 | 1 |
| Oil of wintergreen | 3 | | 6 | | 2 | 3 |
| Oil of lemon | | | | 3 | | |
| Hyamine 3500 | 20 | 24 | 18 | 27 | 21 | 20 |
| Totals | 100 | 100 | 100 | 100 | 100 | 100 |

TABLE II (A) *Staph. aureus*, Gram-positive group

| Time (minutes): | Colony count/cc. |
|---|---|
| 0 | 100,000 |
| 5 | 20,000 |
| 10 | 11,000 |
| 30 | 5,000 |
| 60 | No growth |
| 120 | No growth |

On 60 minute and 120 minute specimens culture for 48 hours—showing no growth.

(B) Yeast

No growth on any specimen when incubated for 48 hours.

(C) *E. coli*, Pseudomonas, Gram-negative group

| Time (minutes): | Colony count/cc. |
|---|---|
| 0 | 2,500,000 |
| 5 | 120,000 |
| 10 | 80,000 |
| 15 | 5,000 |
| 30 | No growth |
| 60 | No growth |
| 120 | No growth |

No growth cultures continued for 48 hours without change.

(D) *Clostridium perfringens*

| Time (minutes): | Colony count/cc. |
|---|---|
| 0 | 100,000 |
| 5 | 40,000 |
| 10 | 38,000 |
| 15 | 24,000 |
| 30 | 13,000 |
| 60 | 9,000 |
| 120 | 4,000 |

I claim

1. A retarded vaporization composition which releases odoriferous material at its surface on contact with water consisting essentially of a uniform stable non-aqueous homogeneous colloidal gel system of at least about 4 weight percent finely divided fumed amorphous silica, about 5 to 25 weight percent of a gelatinizing agent capable of being suspended in a non-aqueous colloidal system and capable of forming an aqueous colloidal gel on contact with water, about 1 to 15 weight percent of a non-polar organic liquid odoriferous material which is not miscible with water, a compound selected from the group consisting of non-ionic surfactants, monohydric alcohols which are at least partially miscible with water, and mixtures thereof, and a polyhydric alcohol which is at least partially miscible with water, the weight ratio of said non-ionic surfactant, monohydric alcohol or mixture thereof to said polyhydric alcohol being between 1 to 10 and 2 to 1, said gel system being heat cured by heating to about 110° F. to 160° F. for about one-quarter hour to 8 hours.

2. A retarded vaporization composition in accordance with claim 1 in which the gelatinizing agent is gelatin.

3. A retarded vaporization composition in accordance with claim 1 in which the odoriferous material is an essential oil.

4. A retarded vaporization composition according to claim 1 wherein the finely divided fumed amorphous silica has an average particle size of about 0.011 micron and an approximate surface area of about 160 square meters per gram.

5. A retarded vaporization composition according to claim 1 wherein said odoriferous material includes an olefactory suppressant.

6. A retarded vaporization composition according to claim 1 wherein said system contains about 20 to about 40 weight percent solids.

7. A retarded vaporization composition according to claim 1 wherein said system also includes about 6 to about 30 weight percent of a non-polar bactericidal agent which is also released upon contact with water.

8. A retarded vaporization composition according to claim 7 wherein said bactericidal agent comprises at least one quarternary ammonium compound.

9. A retarded vaporization composition according to claim 8 wherein said bactericidal agent comprises at least one alkyl dimethyl benzyl ammonium chloride having from 8 to 18 carbon atoms in the alkyl group.

10. A process for forming a retarded vaporization composition of claim 1 which comprises uniformly blending the components together, and then heating the resulting blend at a temperature of about 110° F. to 160° F. for about one-quarter hour to 8 hours.

References Cited

UNITED STATES PATENTS

| | | | |
|---|---|---|---|
| 2,566,410 | 9/1951 | Griffin | 252—316 X |
| 2,871,526 | 2/1959 | Bulloff | 21—55 X |
| 2,927,055 | 3/1960 | Lanzet | 21—55 X |
| 2,837,462 | 6/1958 | Morin | 424—76 X |
| 2,422,145 | 6/1947 | Taylor | 252—316 X |

FOREIGN PATENTS 938,039  9/1963  Great Britain _____ 252—316

RICHARD D. LOVERING, Primary Examiner

U.S. Cl. X.R.

21—55; 71—3; 252—316, 522